US008184312B2

(12) United States Patent
Tsuboi et al.

(10) Patent No.: US 8,184,312 B2
(45) Date of Patent: May 22, 2012

(54) IMAGE PROCESSING SYSTEM WITH EXCELLENT OPERABILITY

(75) Inventors: Tomo Tsuboi, Itami (JP); Kazuo Matoba, Akashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1064 days.

(21) Appl. No.: 11/179,767

(22) Filed: Jul. 13, 2005

(65) Prior Publication Data

US 2006/0232795 A1 Oct. 19, 2006

(30) Foreign Application Priority Data

Apr. 19, 2005 (JP) ................................. 2005-121323

(51) Int. Cl.
*G06F 3/12* (2006.01)
*G06F 15/16* (2006.01)

(52) U.S. Cl. ........................ 358/1.15; 358/1.13; 709/203

(58) Field of Classification Search .................... 358/1.1, 358/1.15, 1.16; 726/21, 26
See application file for complete search history.

(56) References Cited

U.S. PATENT DOCUMENTS

| 5,978,477 | A | | 11/1999 | Hull et al. |
| 6,100,994 | A | * | 8/2000 | Schliekelmann et al. ... 358/1.15 |
| 6,437,875 | B1 | | 8/2002 | Unno |
| 6,567,547 | B1 | | 5/2003 | Roman |
| 6,704,118 | B1 | | 3/2004 | Hull et al. |
| 6,751,780 | B1 | | 6/2004 | Neff et al. |
| 6,766,069 | B1 | | 7/2004 | Dance et al. |
| 2001/0029521 | A1 | | 10/2001 | Matsuda et al. |
| 2001/0050782 | A1 | * | 12/2001 | Niitsuma et al. .............. 358/1.15 |
| 2003/0084085 | A1 | * | 5/2003 | Breidenbach et al. ............ 709/1 |
| 2004/0066530 | A1 | * | 4/2004 | Wu et al. ....................... 358/1.15 |
| 2004/0160629 | A1 | * | 8/2004 | Hull et al. ..................... 358/1.15 |
| 2004/0172440 | A1 | * | 9/2004 | Nakajima et al. .............. 709/200 |
| 2004/0216058 | A1 | * | 10/2004 | Chavers et al. ................ 715/810 |
| 2006/0098224 | A1 | * | 5/2006 | Tsuboi et al. ................. 358/1.15 |

FOREIGN PATENT DOCUMENTS

| JP | 08-314856 | | 11/1996 |
| JP | 10-111793 | A | 4/1998 |
| JP | 2000-163377 | | 6/2000 |
| JP | 2000-242447 | A | 9/2000 |
| JP | 2001-333237 | A | 11/2001 |
| JP | 2002-007095 | A | 1/2002 |
| JP | 2003-046700 | | 2/2003 |

OTHER PUBLICATIONS

Japanese Office Action dated Nov. 28, 2006 (with English translation).
Japanese Office Action dated Feb. 6, 2007 (with English Translation).

* cited by examiner

*Primary Examiner* — King Poon
*Assistant Examiner* — Ming Hon
(74) *Attorney, Agent, or Firm* — Buchanan, Ingersoll & Rooney PC (57) ABSTRACT

When a log-in is accepted at an image processing apparatus (for example, an MFP), a user terminal logged-in with the same log-in information is searched for, and information related to applications being active on that terminal is obtained. An interaction processing key indicative of an application related to a basic function selected as a function to be used is displayed out of the applications. When the user selects the interaction processing key to execute the desired processing, the MFP requests a job to the user terminal to execute the processing interactively with the corresponding application.

21 Claims, 12 Drawing Sheets

| TYPE OF APPLICATION | APPLICATION | MFP FUNCTION | | |
|---|---|---|---|---|
| | | SCAN | PRINT | FACSIMILE |
| WORD PROCESSING | APPLICATION1 | | ○ | ○ |
| | APPLICATION2 | | ○ | ○ |
| SPREADSHEET | APPLICATION3 | | ○ | ○ |
| | APPLICATION4 | | ○ | ○ |
| BROWSER | APPLICATION5 | | ○ | ○ |
| | APPLICATION6 | | ○ | ○ |
| MAILER | APPLICATION7 | | ○ | ○ |
| | APPLICATION8 | | ○ | ○ |
| FILE COMPRESSION | APPLICATION9 | ○ | | |
| | APPLICATION10 | ○ | | |
| IMAGE CONVERSION/ DISPLAY | APPLICATION11 | ○ | ○ | ○ |
| | APPLICATION12 | ○ | ○ | ○ |
| PDF CREATION/ DISPLAY | APPLICATION13 | ○ | ○ | ○ |
| | APPLICATION14 | ○ | ○ | ○ |
| OCR | APPLICATION15 | ○ | | |
| ENCRYPTION | APPLICATION16 | ○ | | |

IMAGE PROCESSING SYSTEM WITH EXCELLENT OPERABILITY

This application is based on Japanese Patent Application No. 2005-121323 filed with the Japan Patent Office on Apr. 19, 2005, the entire content of which is hereby incorporated by reference.

BACKGROUND OF THE INVENTION

1. Field of the Invention

The invention relates to an image processing system, an image processing apparatus, and an image processing program product, and particularly, to an image processing system, an image processing apparatus, and an image processing program product allowing desired processing to be executed with easy operations.

2. Description of the Related Art

Generally, image processing apparatuses, which have multiple functions and which are referred to as MFP (Multi Function Peripherals), have a plurality of basic functions such as a print function, a copy function, a facsimile function, and a scan function. For each basic function, further advanced functions can be selected. For example, for the print function, a box print function, a confidential print function, a check print function and the like can be selected. For the scan function, a file format conversion function, Scan To SMB function and the like can be selected. For the facsimile function, a broadcast function, a polling function and the like can be selected.

In such a general MFP, the basic and advanced functions are installed as applications on the MFP with shipment, and thus they can be used.

However, with sophistication of the recent network technique, an application file for realizing such functions, even of a large capacity, can be downloaded through a network. Accordingly, in common application usage, an application not installed with shipment is downloaded and obtained through a network to be installed on the main body at a later date as necessary.

Another usage of an application being proposed is to store an application file, to which image processing is performed, in other apparatus such as a server, transfer an image input to MFP to the other apparatus and perform the image processing using the application, and transfer the image back to MFP to be output. An image processing apparatus using an application stored in another apparatus is disclosed, for example, in Japanese Laid-Open Patent Publication No. 2003-46700. In the image formation apparatus proposed therein, image information being read is PDF-converted and transmitted to a designated personal computer, and an image display application is activated on the personal computer to display the image information.

However, when selecting or using a function (application) stored in another apparatus as described above, it is necessary to open a dedicated window or to conduct a special operation setting for connecting to that another apparatus. Thus, there is a problem that the operation is difficult with a conventional image processing apparatus which is configured to allow selection of functions to be used among the functions determined in accordance with basic functions being installed.

Additionally, there is a problem that the operability of an operation panel of a conventional image processing apparatus with such a configuration is poor.

SUMMARY OF THE INVENTION

The present invention has been made in the light of foregoing, and an object thereof is to provide an image processing system, an image processing apparatus, and an image processing program product allowing desired processing to be executed with easy operations using functions stored in other apparatus.

In order to achieve the foregoing object, according to an aspect of the present invention, an image processing system includes an information processing apparatus and an image processing apparatus. The information processing apparatus includes a first log-in unit accepting a log-in operation of a user to obtain first log-in information, and a first application information obtaining unit obtaining application information that is information related to an active application. The image processing apparatus includes a second log-in unit accepting a log-in operation of the user to obtain second log-in information, a function selecting unit selecting a function to be used, a searching unit searching for the information processing apparatus logged in with the first log-in information identical to the second log-in information, a second application information obtaining unit obtaining the application information from the information processing apparatus, a presenting unit presenting an application related to the function out of the application information, and a transmission unit transmitting a processing request with the application related to the function to the information processing apparatus.

According to another aspect of the present invention, an image processing apparatus includes a selecting unit selecting an internal function that is a function in the image processing apparatus, a presenting unit presenting an external function related to the internal function out of external functions that are functions of other apparatus, and a requesting unit requesting processing with the external function related to the internal function.

According to still another aspect of the present invention, a program product for causing a computer to execute in an image processing apparatus image processing including a selecting step of selecting an internal function that is a function in the image processing apparatus, a presenting step of presenting an external function related to the internal function out of external functions that are functions of other apparatus, and a requesting step of processing with the external function related to the internal function.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, referring to the drawings, an embodiment of the present invention will be described. Throughout the description, the identical components and constituents are denoted by an identical reference character. Their name and function are also the same. Accordingly, detailed description thereof will not be repeated.

Figure 1:
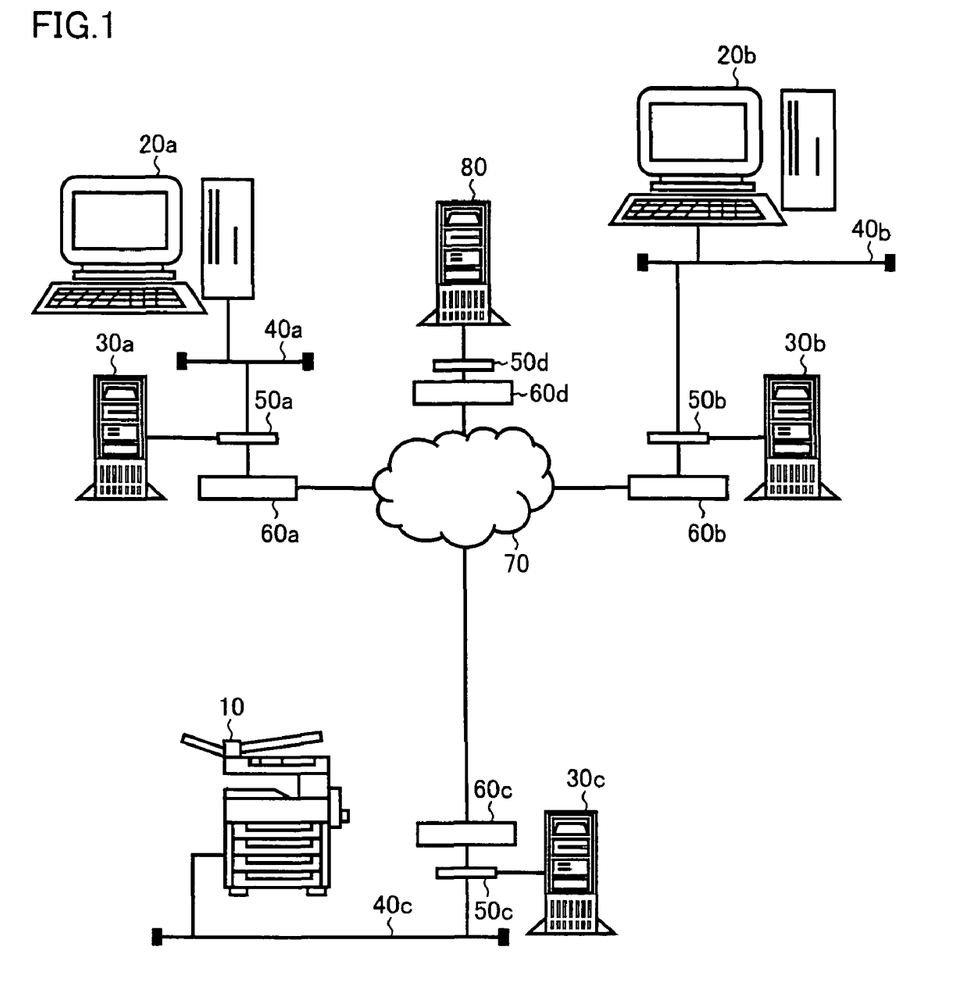
FIG. 1 shows a specific example of a configuration of an image processing system including an image processing apparatus according to an embodiment.

Referring to FIG. 1, an image processing system including an image processing apparatus according to the present embodiment is configured to include a plurality of sites connected to a wide area network 70 such as the Internet.

A first site is configured to include a mail server 30a connected to wide area network 70 via a firewall 60a and a router 50a, and a user terminal 20a that is a personal computer or the like connected thereto further via LAN (Local Area Network) 40a. A second site is configured to include a mail server 30b connected to wide area network 70 via a firewall 60b and a router 50b, and a user terminal 20b that is a personal computer or the like connected thereto further via LAN 40b. A third site is configured to include a mail server 30c connected to wide area network 70 via a firewall 60c and a router 50c, and an MFP (Multi Function Peripherals) 10 that is an image processing apparatus according to the present embodiment connected thereto further via LAN 40c. A fourth site is configured to include an LDAP (Lightweight Directory Access Protocol) server 80, which is a server for authentication storing user information and which is connected to wide area network 70 via a firewall 60d and a router 50d.

User terminals 20a and 20b are representatively referred to as a user terminal 20; mail servers 30a, 30b and 30c are representatively referred to as a mail server 30; LAN 40a, 40b, 40c, and 40d are representatively referred to as a LAN 40; routers 50a, 50b, 50c, and 50d are representatively referred to as a router 50; and firewalls 60a, 60b, 60c, and 60d are representatively referred to as a firewall 60.

Firewall 60 allows an e-mail to pass, that is a packet related to SMTP (Simple Mail Transfer Protocol). Mail server 30 supports SMTP extension function (RFC1891: SMTP Service Extension for Delivery Status Notifications), enhanced status codes (RFC1893: Enhanced Mail System Status Codes), and Multipurpose Internet Message Extensions (MME) media type (RFC1892: The Multipart/Report Content Type for the Reporting of Mail System Administrative Messages, RFC1894: An Extensive Message Format for Delivery Status Notifications). MFP 10 and user terminal 20 are capable of sending and receiving an e-mail via mail server 30 in the same site. It is noted that, attachment of image data to an e-mail is to be compliant with RFC2301-RFC2306 and ITU-T recommendation T37.

Figure 2:
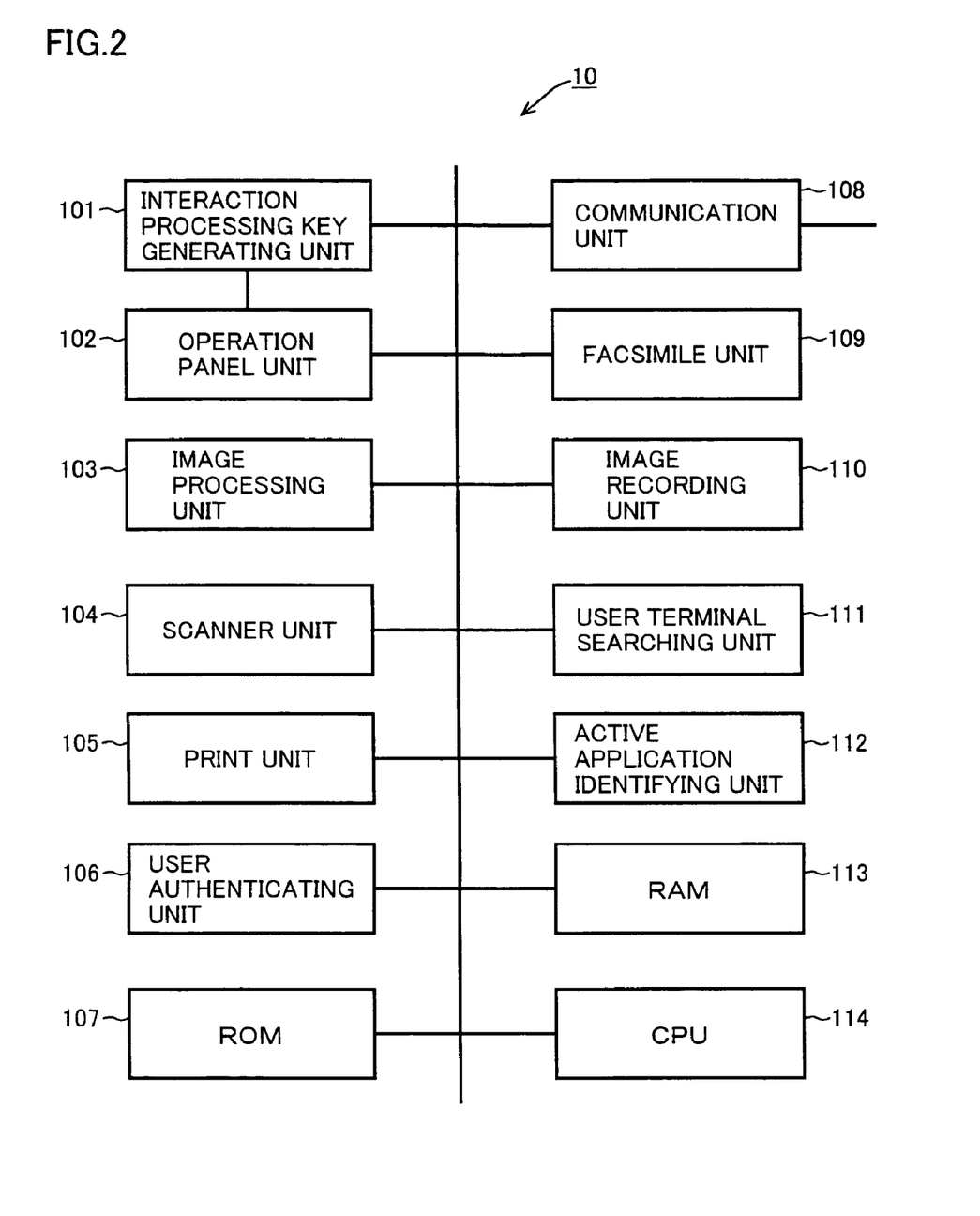
FIG. 2 shows a specific example of a configuration of MFP 10.

FIG. 2 is an image processing apparatus according to the present embodiment, and shows a specific example of the configuration of MFP 10 in FIG. 1.

Referring to FIG. 2, MFP 10 includes a CPU (Central Processing Unit) 114 and a ROM (Read Only Memory) 107 and a RAM (Random Access Memory) 113 that are storage apparatuses, as well as an interaction processing key generating unit 101 generating interaction processing keys described later, an operation panel unit 102 accepting a user operation, an image processing unit 103, a scanner unit 104, a print unit 105, a facsimile unit 109, a user authenticating unit 106, a communication unit 108 connecting to wide are network 70 through LAN 40c or the like, an image recording unit 110 recording image data, a user terminal searching unit 111, and an active application identifying unit 112 which are controlled by CPU 114.

ROM 107 and/or RAM 113 that are storage apparatuses store a program, data and the like, and CPU 114 reads and executes the program to control the entire MFP 10. ROM 107 and/or RAM 113 also serve as a workspace therefor.

Figure 3:
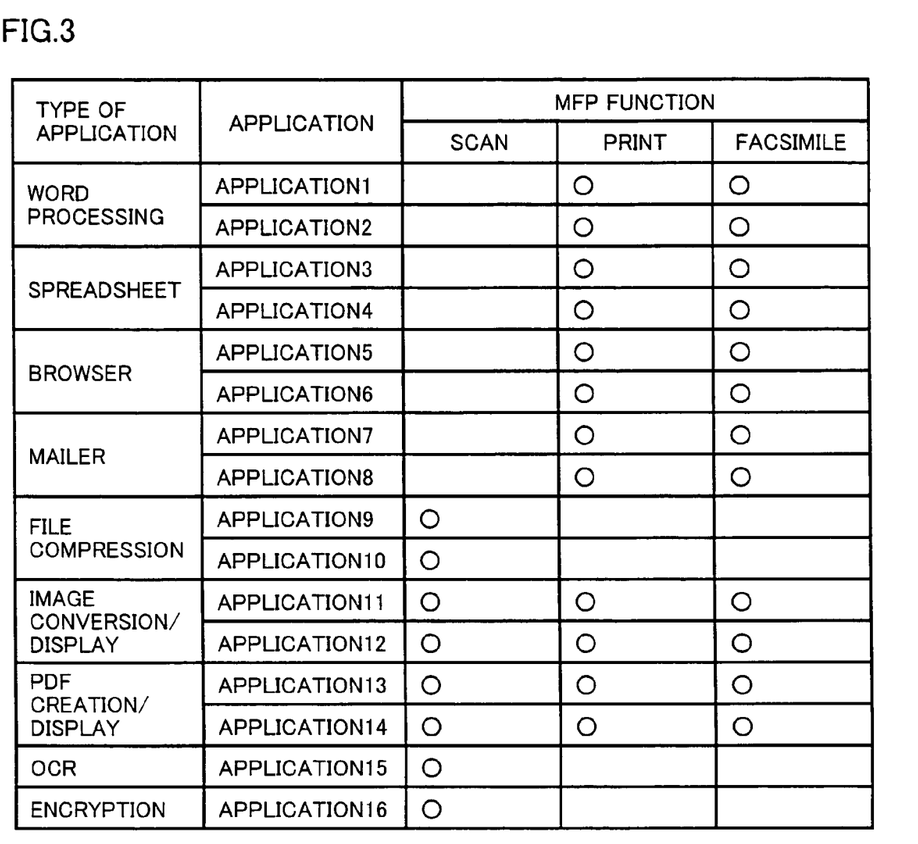
FIG. 3 shows a specific example of the correspondence of basic functions and applications related to the basic functions.

The storage apparatus such as RAM 113 stores the correspondence between the aforementioned basic functions (the print function, copy function, facsimile function, scan function and the like) and the applications related to respective functions. FIG. 3 shows a specific example of the correspondence between the basic functions and the applications related to respective functions as stored in the storage apparatus. Referring to FIG. 3, the storage apparatus of MFP 10 such as RAM 113 stores related applications for each basic function. For example, as to the print function, word processing applications 1 (such as Word) and 2 (such as Ichitaro®), spreadsheet applications 3 (such as Excel) and 4 (such as Lotus 1-2-3®), website browsing applications 5 (such as Internet Explorer) and 6 (such as Netscape®), e-mail transmission/reception applications 7 (such as Outlook Express) and 8 (such as AL-Mail®), image conversion and display applications 11 and 12, and PDF file creation and display applications 13 (such as Acrobat Reader®) and 14 are stored as the related applications.

Operation panel unit 102 inputs an operation signal corresponding to a user's operation to CPU 114. CPU 114 outputs to each unit a control signal corresponding to the operation signal input from operation panel unit 102.

In accordance with the control signal input from CPU 114, user authenticating unit 106 authenticates a user based on log-in information of the user input from operation panel unit 102.

In accordance with the control signal input from CPU 114, scanner unit 104 reads an original being set and generates image data and inputs it to image processing unit 103 or image recording unit 110. In accordance with the control signal input from CPU 114, image processing unit 103 processes the image data input from scanner unit 104 or the image data read from image recording unit 110, and inputs it to print unit 105, facsimile unit 109, image recording unit 110 or communication unit 108.

In accordance with the control signal input from CPU 114, print unit 105 prints the image data input from image processing unit 103 or the image data read from image recording unit 110 on a paper. In accordance with the control signal input from CPU 114, facsimile unit 109 faxes the image data input from image processing unit 103 or the image data read from image recording unit 110 to a designated address. In accordance with the control signal input from CPU 114, communication unit 108 transmits image data attached to an e-mail data input from image processing unit 103 to an address designated in the e-mail.

In accordance with the control signal input from CPU 114, user terminal searching unit 111 requests to LDAP server 80 via communication unit 108 information specifying user terminal 20 logging in with the same log-in information, based on log-in information of a user input from operation panel unit 102. Then, based on information provided from LDAP server 80, user terminal searching unit 111 searches for user terminal 20 logging in with the same log-in information in the image processing system, and inputs a search result to an active application identifying unit 112.

In accordance with the control signal input from CPU 114, active application identifying unit 112 obtains active application information that is information related to an application being active on user terminal 20 logging in with the same log-information, which is the search result input from user terminal searching unit 111, and identifies applications being active on user terminal 20 from that information. Then, it refers to the correspondence with each basic function stored in the storage applications such as RAM 113. From the identified applications, active application identifying unit 112 identifies an application related to the basic function being selected, and requests to interaction processing key generating unit 101 generation of an interaction processing key, which shows an application that is active on user terminal 20 and that is capable of executing processing interactively with the basic function.

In accordance with the control signal input from CPU 114, interaction processing key generating unit 101 generates an interaction processing key in accordance with the request from active application identifying unit 112, and inputs it to operation panel unit 102. Operation panel unit 102 displays the interaction processing key input from interaction processing key generating unit 101 on a window corresponding to the selected basic function.

CPU 114 detects the operation of the interaction processing key, and transmits a processing request with the corresponding application together with image data to user terminal 20 via transmission unit 108, so that the image data is processed with the application.

Figure 4:
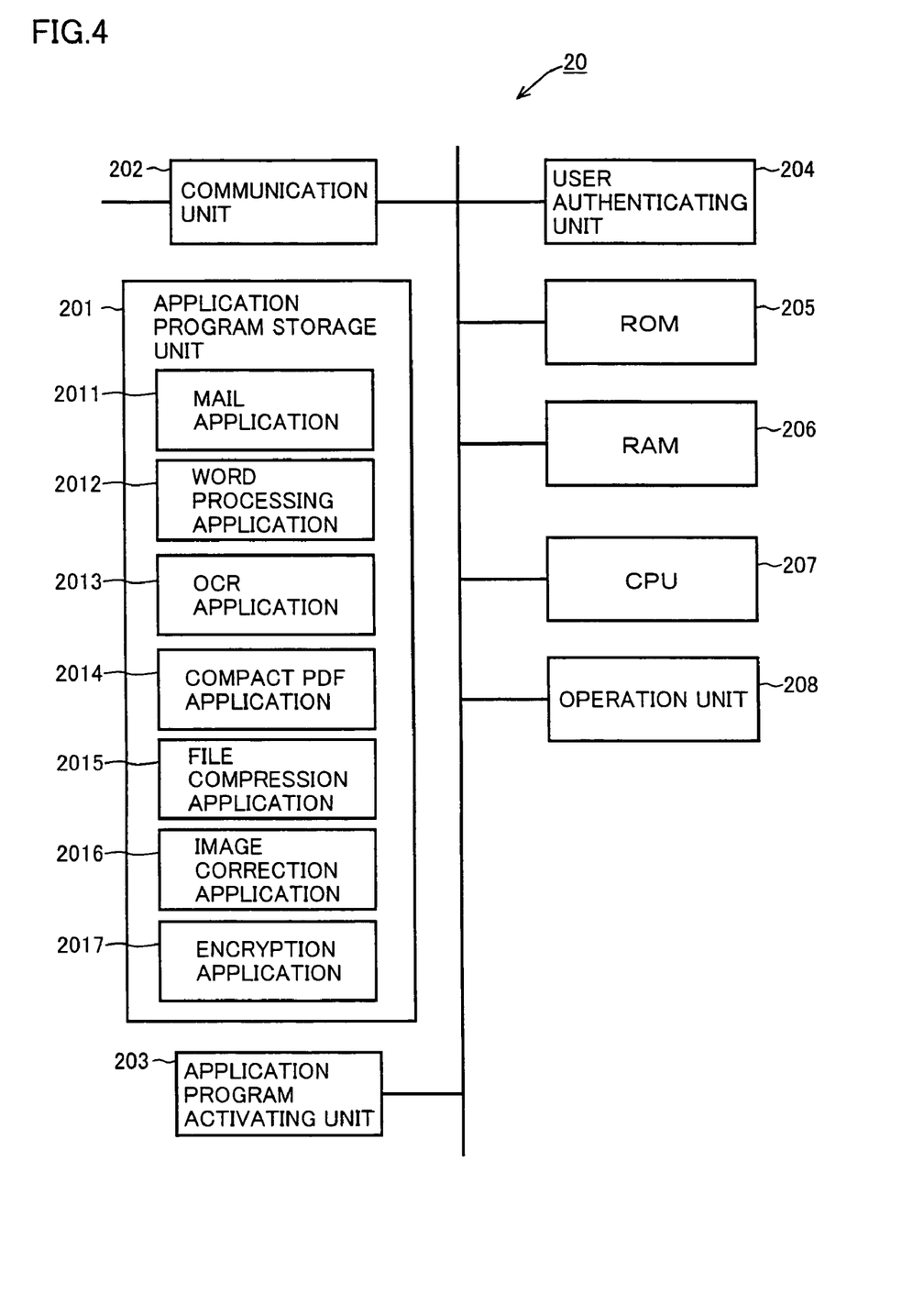
FIG. 4 shows a specific example of a configuration of user terminal 20.

Referring to FIG. 4, user terminal 20 is configured to include a CPU 207 controlling the entire user terminal 20, and a ROM 205 and a RAM 206 that are storage apparatuses storing a program, data and the like executed by CPU 207, as well as an operation unit 208 accepting a user's operation, a user authenticating unit 204, a communication unit 202 connecting to wide area network 70 via LAN 40a, 40b or the like, an application program storage unit 201 storing application programs, and an application program activation unit 203 that activates the applications stored in application program storage unit 201, which are controlled by CPU 207.

Further, in application program storage unit 201, a mail application 2011 for creating a mail, a word processing application 2012 for creating a document, an OCR (Optical Character Reader) application 2013 for character recognition, a compact PDF application 2014 for creating a file of compact PDF format, a file compression application 2015 for compressing a file, an image correction application 2016 for image correction, and encryption application 2017 for data encryption.

Operation unit 208 inputs an operation signal corresponding to a user's operation to CPU 207. CPU 207 outputs to each unit a control signal corresponding to the operation signal input from operation unit 208.

In accordance with the control signal input from CPU 207, user authenticating unit 204 authenticates a user based on log-in information of the user input from operation unit 208.

In accordance with the control signal input from CPU 207, application program activation unit 203 accesses to application program storage unit 201, and reads and activates a necessary application. Additionally, it controls information of the application that is currently active.

Figure 5:
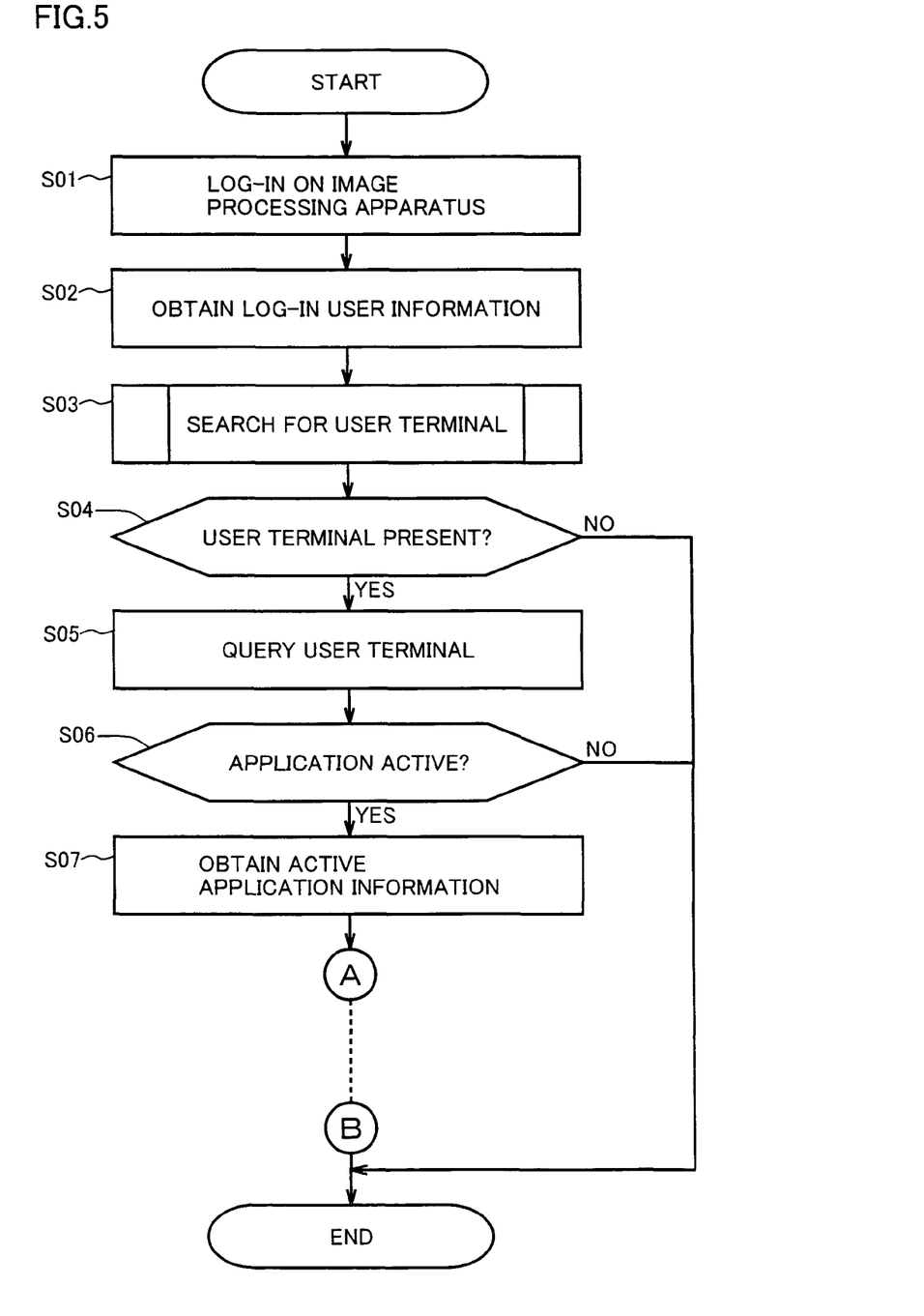
FIGS. 5 and 6 show a flowchart showing processes executed at MFP 10.
Figure 6:
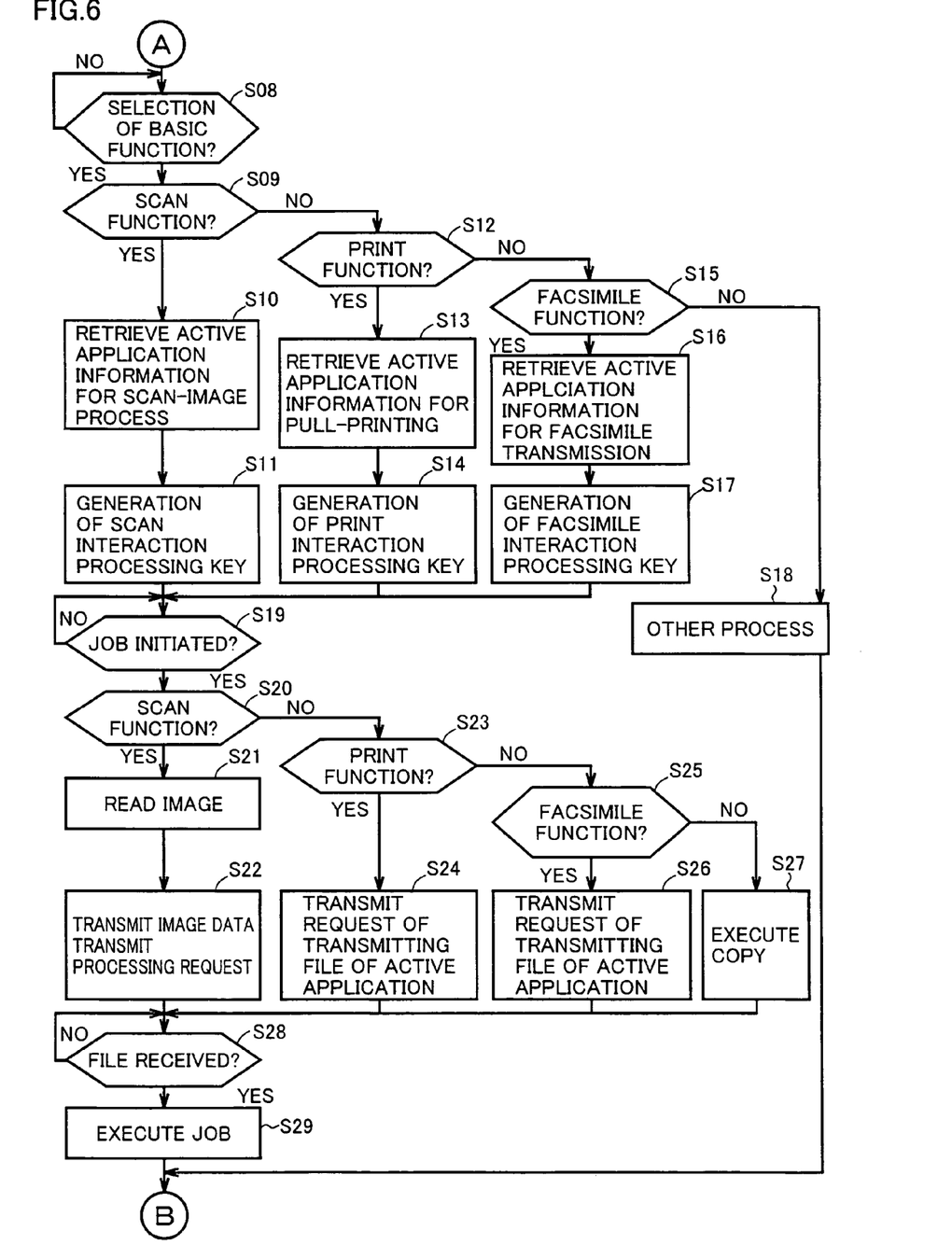

FIGS. 5 and 6 show a flowchart showing processes executed at MFP 10 that is the image processing apparatus according to the present embodiment. The processes shown in the flowcharts of FIGS. 5 and 6 are realized by CPU 114 of MFP 10 reading and executing a program stored in ROM 107 or the like and controlling each unit shown in FIG. 2.

Figure 7:
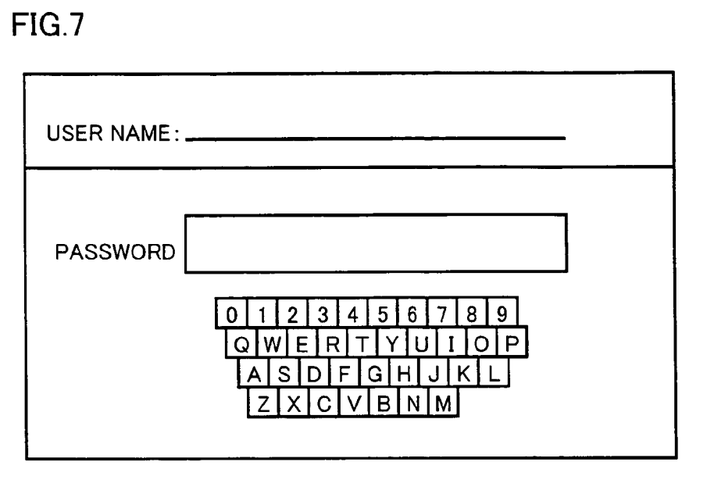
FIG. 7 shows a specific example of a log-in window.

Referring to FIG. 5, first, a log-in window of FIG. 7 is shown in operation panel unit 102; an input of log-in information by a user is accepted (step S01); and information of the user logged in is obtained (step S02).

In user terminal searching unit 111, based on the log-in information of the user obtained at step S02, user terminal 20 logging in with the same log-in information in the image processing system is searched for (step S03).

Figure 8:
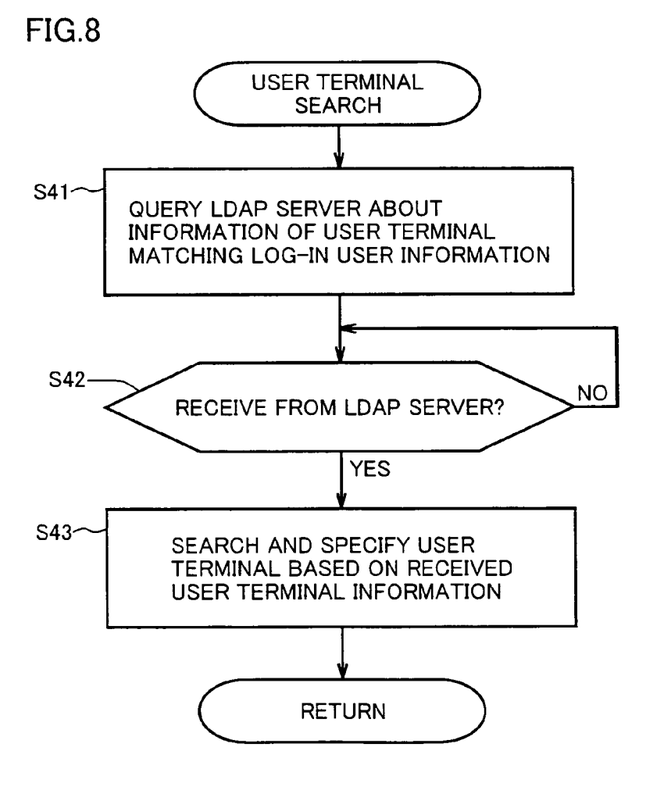
FIG. 8 is a flowchart showing a user terminal searching process at step S03.

The user terminal searching process at step S03 is executed as follows. Referring to FIG. 8, first, LDAP server 80 is queried via communication unit 108 about information specifying user terminal 20 logging in with the same log-in information (step S41), and when information specifying the matching user terminal 20 is returned from LDAP server 80 (YES at step S42), the matching user terminal 20 is searched for and specified, based on the received information (step S43).

Thus, by searching for the user terminal logging in with the user information that is identical to that of the user logged in MPF 10 that is the image processing apparatus, user terminal 20 that is currently used by the user can be specified, and the user terminal for identifying an active application can be narrowed. Therefore, the functions considered to be desired by the user to use can efficiently be presented more quickly.

As a result of the user terminal searching process, if the matching user terminal 20 is in the image processing system (YES at step S04), active application identifying unit 112 queries user terminal 20 about active application information (step S05). If there is an active application in user terminal 20 (YES at step S06), active application information is obtained from application program activation unit 203 of user terminal 20 (step S07).

Subsequently, a user operation is monitored by CPU 114 (step S08). If selection of any basic function is detected (YES at step S08), then the process corresponding to the selected basic function is executed (step S10-S17).

Specifically, if the function selected at step S08 is a scan function for scanning and transmitting image data to a prescribed location (YES at step S09), then active application identifying unit 112 retrieves the active application information of user terminal 20, which has been obtained at step S07, and an application related to the scan-image processing is identified (step S10). Then, a scan interaction processing key that can process interactively with the scan function is generated in interaction processing key generation unit 101 (step S11). Further, if the basic function selected at step S08 is a print function (NO at step S09 and YES at S12), active application identifying unit 112 retrieves the active application information of user terminal 20, which has been obtained at step S07, and an application related to pull-printing is identified (step S13). Then, a print interaction processing key that can process interactively with the print function is generated in interaction processing generation unit 101 (step S14). If the basic function selected at step S08 is a facsimile function (NO at steps S09 and S12 and YES at S15), active application identifying unit 112 retrieves the active application information of user terminal 20, which has been obtained at step S07, and the application related to facsimile transmission is identified (step S16). Then, a facsimile interaction processing key that can process interactively with the facsimile function is generated in interaction processing generation unit 101 (step S17). The basic functions subjected to the aforementioned processes is not limited to the scan, print and facsimile functions, and other functions such as a mail transmission function may be included. The same holds true for the following processes. It is noted that, when the basic function selected at step S08 is not any of the basic functions of the aforementioned processing target (NO at steps S09, S12 and S15), other process corresponding to the selected basic function is executed (step S18).

Subsequently, an operation of job initiation is monitored at CPU 114 (step S19). If the operation of job initiation is detected as any interaction processing key is pressed (YES at step S19), a process corresponding to the selected basic function (for example, the scan, print or facsimile function) is executed at CPU 114 (steps S21-S27).

Specifically, if the basic function selected at step S08 is the scan function, and the scan function interaction key is pressed and a job is initiated (YES at step S20), then an original image is read by scanner unit 104 (YES at step S21), and a processing request with the interacting application is transmitted together with image data to user terminal 20 via communication unit 108 (step S22). If the basic function selected at step S08 is the print function, and the print function interaction key is pressed and a job is initiated (NO at step S20 and YES at S23), a file transmission request of an interacting application is transmitted to user terminal 20 via communication unit 108 (step S24). If the basic function selected at step S08 is the facsimile function, and the facsimile function interaction key is pressed and a job is initiated (NO at steps S20 and S23 and YES at S25), a file transmission request of an interacting application is transmitted to user terminal 20 via communication unit 108 (step S26). When the job related to none of the aforementioned function is initiated at step S19 (NO at steps S20, S23 and S25), then the copy processing is started at scanner unit 104 and print unit 105 (step S27).

When the matching file, that is, a file of image data processed with the application of user terminal 20 when the job of scan function is executed at steps S20-S22, and a file of the matching application of user terminal 20 when the job of print function is executed at steps S23 and 24 and when the job of facsimile function is executed at steps S25 and S26, is received from user terminal 20 (YES at step S28), the job is executed (step S29) and the series of processes end.

Figure 9:
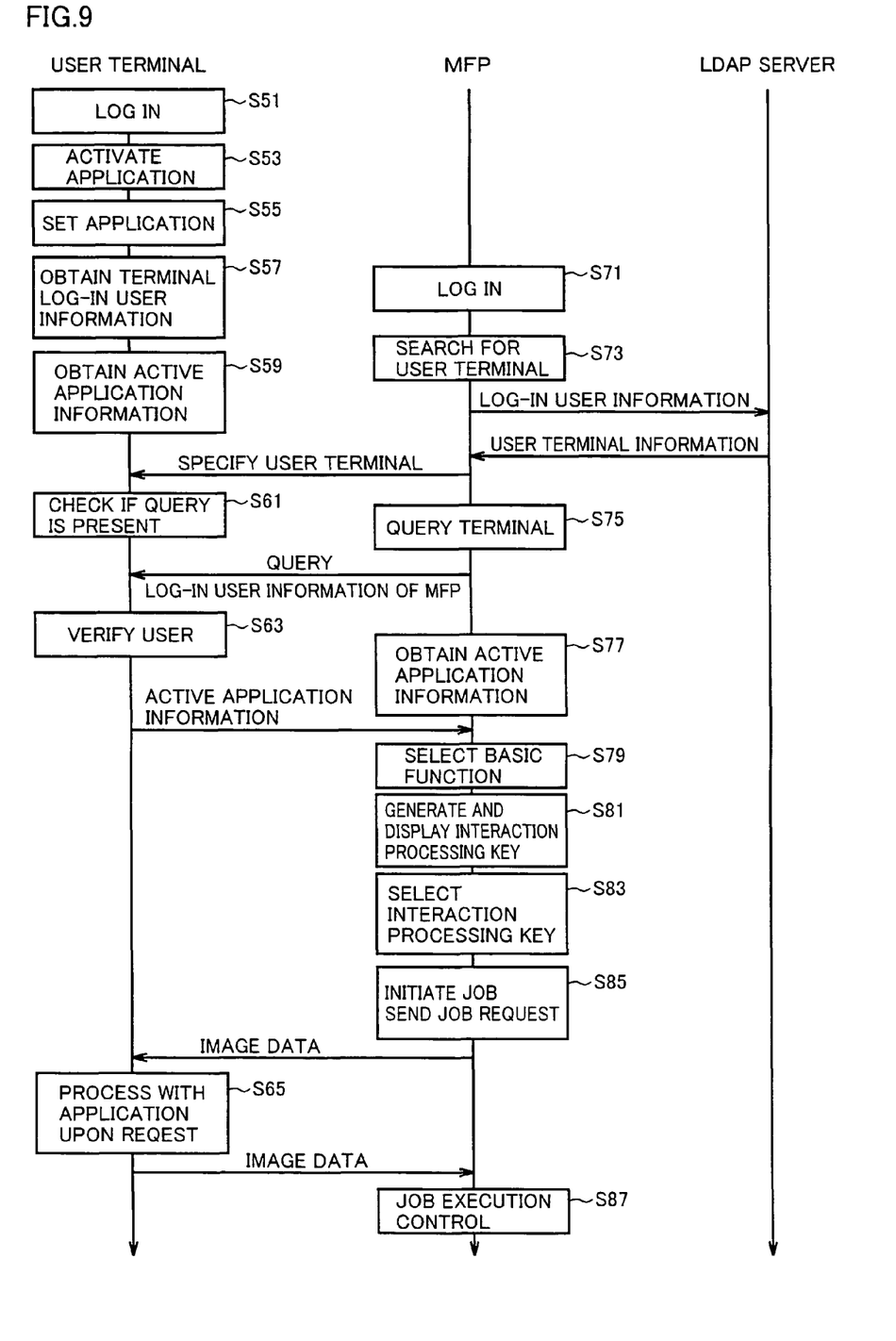
FIG. 9 shows a flow of processes to be executed at the image processing system including the image processing apparatus according to the present embodiment.

FIG. 9 shows a flow of processes to be executed at the image processing system including the image processing apparatus according to the present embodiment, when MFP 10 that is the image processing apparatus according to the present embodiment executes the aforementioned processes.

Referring to FIG. 9, a log-in operation is performed at user terminal 20 (step S51), an application is activated (step S53), and setting for the application is conducted (step S55). Then, information of the user being logged in is obtained at user authenticating unit 204 of user terminal 20 (step S57), and active application information is obtained at application program activation unit 203 (step S59).

When the log-in operation is performed at MFP 10 by the user (step S71), a user terminal logging in with the same log-in information on the image processing system is searched for (step S73). Specifically, MFP 10 queries LDAP server 80 about the log-in information, and obtains the information related to the matching user terminal 20 from LDAP server 80.

MFP 10 specifies user terminal 20, and queries user terminal 20 about log-in information on MFP 10 (step S75).

At user terminal 20, whether or not a query from MFP 10 is present is checked (step S61), and perform user verification at user authenticating unit 204 as necessary (step S63), and from application program activation unit 203, active application information is passed to MFP 10 in accordance with the aforementioned query (step S77).

MFP 10 accepts the selection operation of a basic function from the user (step S79), performs the aforementioned processing, to generate an interaction processing key and displays it on operation panel unit 102 (step S81). Subsequently, it accepts a selection operation of an interaction processing key from the user (step S83), initiates the job, and transmits image data to user terminal 20 thereby transmitting a job request (step S85).

User terminal 20 processes the transmitted image data with the matching application in accordance with the job request from MFP 10 (step S65), and sends the processed image data to MFP 10.

At MFP 10, execution of the job is controlled using the image data transmitted from user terminal 20 (step S87).

Figure 10:
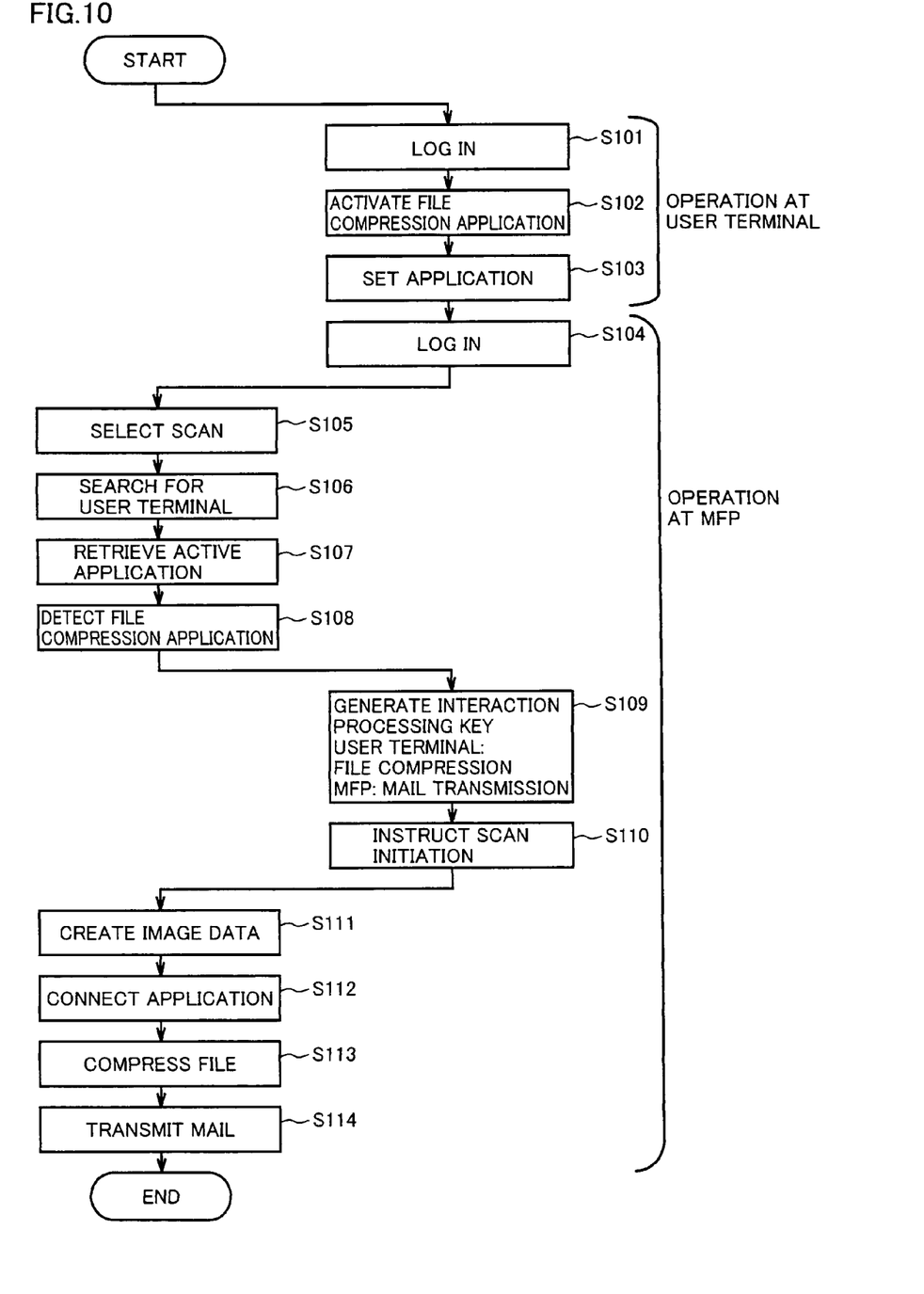
FIGS. 10 and 11 are flowcharts showing a specific example of processes in the image processing system including the image processing apparatus according to the present embodiment.
Figure 11:
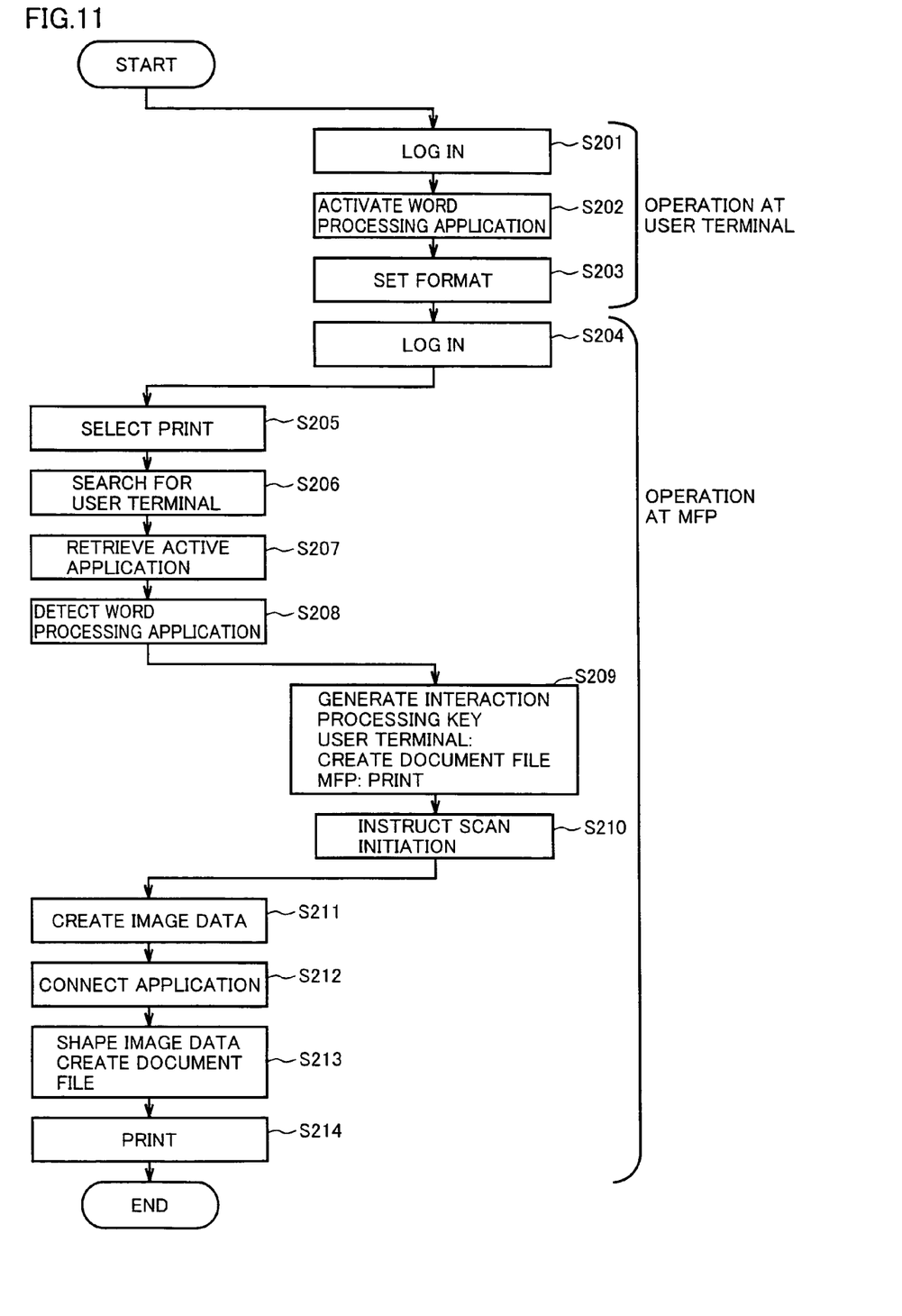

FIGS. 10 and 11 are flowcharts showing a specific example of processes in the image processing system including the image processing apparatus according to the present embodiment. FIG. 10 shows processes when a scan function is selected, and further a file compression function is selected as an application that is related to the scan function and that is active on user terminal 20, while FIG. 11 shows processes when a print function is selected and further a word processing application related to the print function is selected.

Referring to FIG. 10, at user terminal 20, a log-in operation is executed (step S101); file compression application 2015 stored in application program storage unit 201 is activated (step S102); and setting is conducted as to the name of a file to be compressed or the like (step S103).

Next, at MFP 10, a log-in operation is executed with the same log-in information (step S104), and the scan function is selected (step S105). Then, at user terminal searching unit 111, user terminal 20 is searched for (step S106), and at active application identifying unit 112, an application active on user terminal 20 is retrieved (step S107). As a result of retrieval, file compression application 2015 that has been activated at step S102 is retrieved as an application related to the selected scan function (step S108).

As a result of retrieval, at MFP 10, a function combining file compression application 2015 of user terminal 20 and the mail transmission function included in the scan function of MFP 10 is set as the function for processing the job. For the function thus set, a scan function interaction processing key is generated as one function box, which is a storage area of an image storage unit, not shown, provided for each user in which a file is stored and in which processing contents to the stored file is set in advance. The scan function interaction processing key is presented on operation panel unit 102 (step S109).

Further, at MFP 10, the presented scan interaction processing key is selected, and an operation instructing the initiation of scan is accepted (step S110). Then, original image is scanned and image data is created (step S111). MFP 10 connects to file compression application 2015 that is active on user terminal 20 (step S112), compresses the image data using file compression application 2015 on user terminal 20 (step S113), and transmits the compressed image data by mail to the designated address (step S114).

Figure 12:
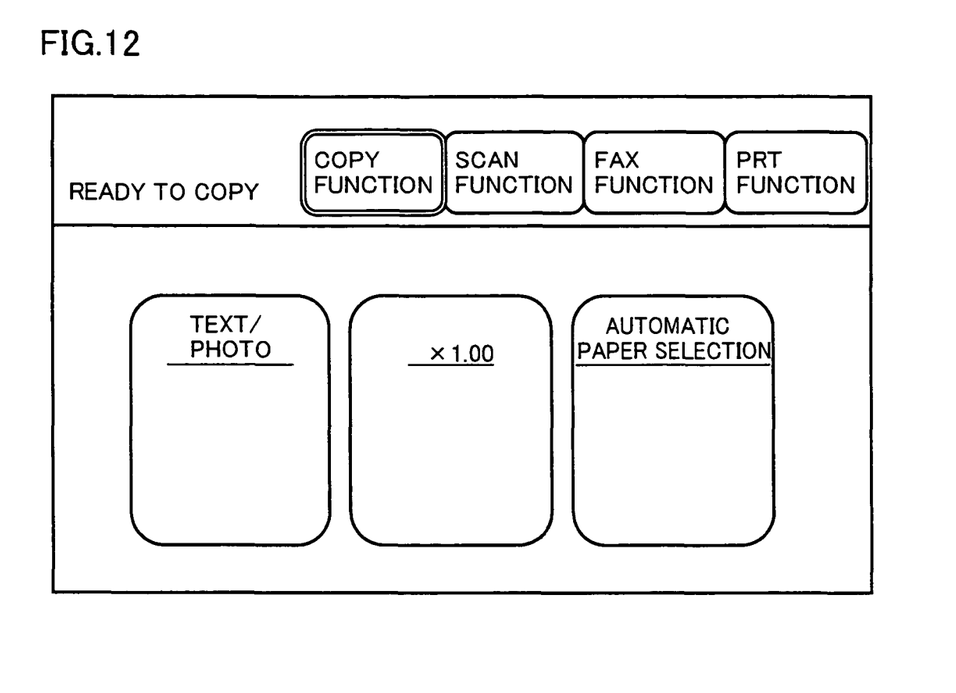
FIG. 12 shows a specific example of a window displayed on operation panel unit 102 of MFP 10 after the log-in at step S104.

FIG. 12 shows a specific example of a window displayed on operation panel unit 102 of MFP 10 after the log-in at step S104. In the specific example, the copy function has been set as a default setting. The user selects a basic function to be used with such a display window to conduct various settings.

Figure 13:
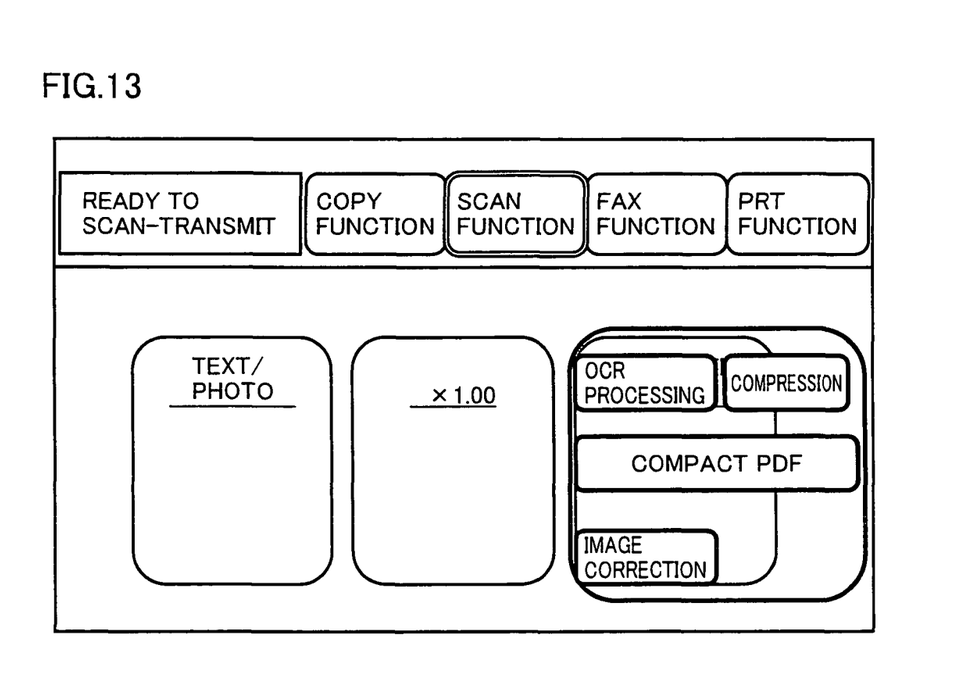
FIGS. 13 and 14 show specific examples of a window displayed on operation panel unit 102 of MFP 10 at steps S107 and S207, respectively.

FIG. 13 shows a specific example of a window displayed on operation panel unit 102 at step S107. At step S107, OCR application 2013, compact PDF application 2014, file compression application 2015, and image correction application 2016 are detected as the applications related to the scan function from the applications active on user terminal 20, and interaction function keys indicative of these applications generated at interaction processing key generating unit 101 are displayed on operation panel unit 102 so that they can be selected. The user selects an application to be used, from the applications that are active on user terminal 20 and that are related to the scan function with such a display window.

Referring to FIG. 11, at user terminal 20, a log-in operation is executed (step S201), word processing application 2012 stored in application program storage unit 201 is activated (step S202), and the setting of document format such as frame of the document, form, image size or the like is conducted (step S203).

Next, at MFP 10, a log-in operation is executed with the same log-in information (step S204), and the print function is selected (step S205). Then, at user terminal searching unit 111, user terminal 20 is searched for (step S206), and at active application identifying unit 112, an application active on user terminal 20 is retrieved (step S207). As a result of retrieval, word processing application 2012 activated at step S202 is retrieved as an application related to the selected print function (step S208).

At MFP 10, when the print function interaction processing keys are displayed based on the execution of the aforementioned processes, and the interaction processing key corresponding to word processing application 2012 is selected, a function combining word processing application 2012 of user terminal 20 and the print function of MFP 10 is set to the box function, as the function for performing the processing of the job, and presented on operation panel unit 102 (step S209).

At MFP 10, an operation of scan initiation instruction is accepted (step S310), and an original image is scanned and image data is created (step S211). MFP 10 connects to word processing application 2012 active on user terminal 20 (step S212), creates on user terminal 20 a document file by shaping image data so as to conform to the set format using word processing application 2012 (step S213), and prints it at print unit 105 of MFP 10 (step S214).

Figure 14:
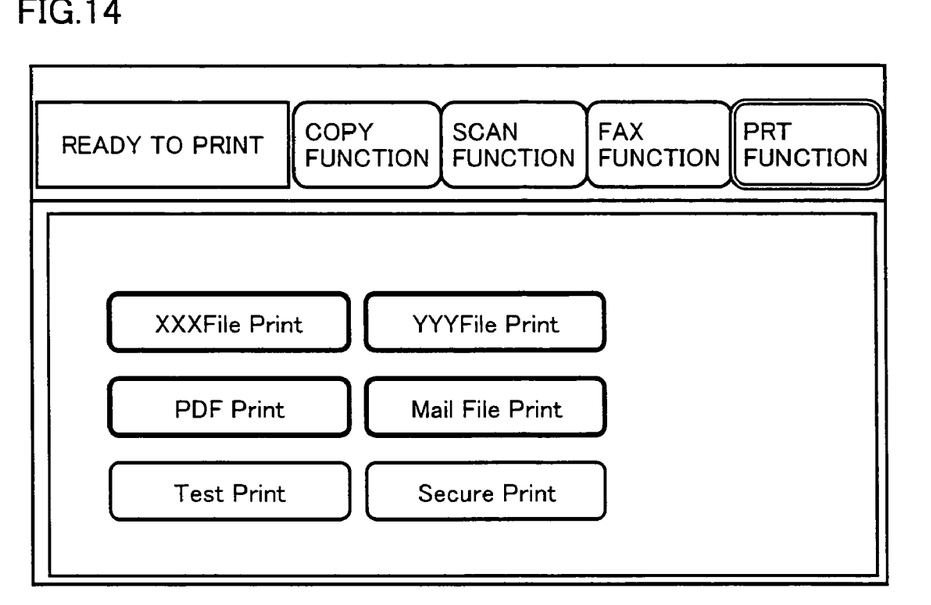

FIG. 14 shows a specific example of the window displayed on operation panel unit 102 at step S207. At step S207, from applications active on user terminal 20, an application for creating a specific file (X file, YYY file, PDF file, mail file) that is word processing application 2012 is detected as an application related to the print function. These interaction function keys indicative of word processing application 2012 created at interaction processing key generating unit 101 are displayed on operation panel unit 102 so that they can be selected. The user selects an application to be used among the applications that are active on user terminal 20 and that are related to the print function.

As the aforementioned processes are executed at MFP 10 that is the image processing apparatus according to the present embodiment, when the user selects a function to be executed at the image processing apparatus, external (installed on other apparatuses) functions that can process interactively with that function are also presented as options. Accordingly, the external functions can be used effectively to extend the functions that can be used with the image processing apparatus.

Additionally, as the external functions being active on the image processing apparatus is automatically retrieved and presented, the external apparatuses can easily be referred to, without requiring the user to search for the external functions. The selection is easy, without requiring the user to designate external apparatuses.

Thus, the user can perform a desired operation more easily.

In the embodiment above, while the example have been described in which user terminal 20 having logged in with the same log-in information is searched for, not only the user terminals having already logged in, but also the terminals allowing the same log-in user to log in may be searched for. Information related to the terminal allowing log-in is preferably stored in LDAP server 80.

In the embodiment above, while an application active on user terminal 20 is identified by searching for user terminal 20 logged in with the same log-in information, instead of using the log-in information, all the applications active on all the user terminals included in the image processing system may be identified and the application related to the selected function may be used interactively with the function. In that case, the processes at steps S03 and S04 are skipped, and all (or active) user terminals 20 included in the image processing system are queried about the activation of applications at step S05, and active application information is obtained.

In the embodiment above, while an application related to the selected function is identified and presented from the applications active on user terminal 20 at the image processing apparatus, not being limited to the active applications, but all applications stored in application program storage unit 201 may be identified and presented, and from which an application to be interactively used may be selected. In that case, application program activation unit 203 of user terminal 20 passes activation information including not only the active applications but also applications stored in application program storage unit 201 to MFP 10. At MFP 10, when using a function not active on user terminal 20 interactively with the selected function, an activation request of the application is transmitted to user terminal together with a processing request at steps S22, S24 and S26.

Further, the image processing method executed at the aforementioned image processing system or image processing apparatus can be provided as a program. Such a program can be recorded with a computer readable recording medium such as a flexible disk, CD-ROM (Compact Disc-Read Only Memory), ROM, RAM and memory cards, which are to be attached a computer, and provided as a program product. Alternatively, a program can be provided as recorded with a recording medium such as hard disk, which is incorporated in a computer. Alternatively, a program can be provided as downloaded via a network.

The provided program product is installed in a program storage unit such as hard disk and executed. It is noted that the program product includes the program itself, and the recording medium recording the program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing system, comprising:
an information processing apparatus; and
an image processing apparatus having a plurality of internal functions, wherein
said information processing apparatus includes
a first log-in unit accepting a log-in operation of a user to obtain first log-in information, and an application information obtaining unit obtaining application information that is information related to an active application, and wherein said image processing apparatus includes a second log-in unit accepting a log-in operation of the user to obtain second log-in information, a function selecting unit selecting, according to user instructions, a first function to be used from said plurality of internal functions, a searching unit searching for said information processing apparatus logged in with said first log-in information identical to said second log-in information, an application identifying unit obtaining said application information from said information processing apparatus and identifying an application related to said user selected first function based on said obtained application information, an interaction processing key generating unit generating an interaction processing key which shows a second function combining said identified application and said user selected first function, a presenting unit presenting said generated interaction processing key, an operation accepting unit accepting an operation of said interaction processing key presented by said presenting unit, and a transmission unit transmitting, when said operation of said interaction processing key is accepted, a request for processing with said application related to said accepted interaction processing key to said information processing apparatus.

2. An image processing system according to claim 1, wherein said searched information processing apparatus is currently used by the user logging-in said image processing apparatus.

3. An image processing system according to claim 1, wherein said image processing apparatus further includes an image storage unit storing image data, wherein said interaction processing key is generated as one function box which is a storage area of said image storage unit.

4. An image processing apparatus network-connected to an information processing apparatus and having a plurality of internal functions, comprising:

a function selecting unit selecting a first function to be used from said plurality of internal functions according to user instruction;

an application identifying unit obtaining information from an information processing apparatus having identical login information as said image processing apparatus, said information relating to an application which is active on said information processing apparatus, said application identifying unit further identifying said application related to said user selected first function based on said obtained information;

an interaction processing key generating unit generating an interaction processing key which shows a second function combining said identified application and said user selected first function, a presenting unit presenting said generated interaction processing key, an operation accepting unit accepting an operation of said interaction processing key presented by said presenting unit, and a transmission unit transmitting, when said operation of said interaction processing key is accepted, a request for processing with said application related to said accepted interaction processing key to said information processing apparatus.

5. The image processing apparatus according to claim 4, further comprising a user authenticating unit authenticating a user, wherein said application identifying unit identifies said application based on an authentication result at said user authenticating unit.

6. The image processing apparatus according to claim 5, further comprising a user terminal searching unit searching for said other information processing apparatus based on said authentication result at said user authenticating unit.

7. An image processing apparatus according to claim 6, wherein said information processing apparatus is currently used by the user logging-in said image processing apparatus.

8. An image processing apparatus according to claim 6, further comprising an image storage unit storing image data, wherein said interaction processing key is generated as one function box which is a storage area of said image storage unit.

9. The image processing apparatus according to claim 4, wherein said function selecting unit selects a print function as said first function, and said presenting unit presents said interaction processing key that shows said second function corresponding to a pull-print function of a document related to an application being active on said other information processing apparatus.

10. The image processing apparatus according to claim 4, wherein said function selecting unit selects a print function as said first function, and said presenting unit presents an application that includes said interaction processing key that shows said second function corresponding to at least one of a pull-print function of a document and a pull-print function of a mail-attached file of the document, the document having been created with a word processing application that is active on said other information processing apparatus.

11. The image processing apparatus according to claim 4, wherein said function selecting unit selects a scan function as said first function, and said presenting unit presents said interaction processing key that shows said second function corresponding to at least one of a scan-image OCR (Optical Character Reader) function, a file format conversion function, a compression function, an image correction function such as a skew correction and an upside-down correction, and an encryption function that are active on said other information processing apparatus.

12. The image processing apparatus according to claim 4, wherein said function selecting unit selects an image transmission function as said first function, and said presenting unit presents said interaction processing key that shows said second function corresponding to processing an image to be transmitted that is active on said information processing apparatus.

13. The image processing apparatus according to claim 4, wherein said function selecting unit selects an image transmission function as said first function, and said presenting unit presents said interaction processing key that shows said second function corresponding to a transmission function of a document related to an application that is active on said information processing apparatus.

14. A non-transitory computer-readable storage medium containing a program for causing an image processing apparatus network-connected to a information processing apparatus and having a plurality of internal functions to execute the following operations:
- a selecting step of selecting, according to user instruction, a first function to be used from said plurality of internal functions of said image processing apparatus;
- an application identifying step of obtaining information from an information processing apparatus having identical login information as said image processing apparatus, said information relating to an application, which is active on said information processing apparatus, said application identifying unit further identifying an application related to said user selected first function based on said obtained information;
- an interaction processing key generating step of generating an interaction processing key which shows a second function combining said identified application and said user selected first function;
- a presenting step of presenting said generated interaction processing key;
- an operation accepting step of accepting an operation of said interaction processing key presented at said presenting step; and
- a transmission step of transmitting, when said operation of said interaction processing key is accepted, a request for processing with said application related to said accepted interaction processing key to said information processing apparatus.

15. The non-transitory computer-readable storage medium according to claim 14, further causing said image processing apparatus to execute
- a user authentication step, in said image processing apparatus, authenticating a user, wherein
- said application is identified based on an authentication result at said user authentication step.

16. The non-transitory computer-readable storage medium according to claim 15, said program further causing said image processing apparatus to execute
- a user terminal searching step searching for said other information processing apparatus based on said authentication result at said user authentication step.

17. The non-transitory computer-readable storage medium according to claim 16, wherein said information processing apparatus is currently used by the user logging-in said image processing apparatus.

18. The non-transitory computer-readable storage medium according to claim 16, wherein
- said image processing apparatus further includes an image storage unit storing image data wherein
- said interaction processing key is generated as one function box which is
- a storage area of said image storage unit.

19. The non-transitory computer-readable storage medium according to claim 14, wherein
- a print function is selected as said first function at said selecting step, and
- said interaction processing key corresponding to a pull-print function of a document is presented at said presenting step, wherein said document is related to an application that is active on said information processing apparatus.

20. The non-transitory computer-readable storage medium according to claim 14, wherein
- an image transmission function is selected as said first function at said selecting step, and
- said interaction processing key corresponding to processing an image to be transmitted that is active on said information processing apparatus is presented at said presenting step.

21. The non-transitory computer-readable storage medium according to claim 14, wherein
- an image transmission function is selected as said first function at said selecting step, and
- said application that is presented at said presenting step includes said interaction processing key corresponding to a transmission function of a document related to an application that is active on said information processing apparatus.

* * * * *